(12) United States Patent
Thompson et al.

(10) Patent No.: US 11,334,640 B2
(45) Date of Patent: May 17, 2022

(54) COMPUTERIZED LOCATION-BASED VISUALIZATION OF WEATHER EVENTS

(71) Applicant: International Business Machines Corporation, Armonk, NY (US)

(72) Inventors: Rodney Thompson, Pelham, NH (US); Douglas George Dempster, Andover, MA (US); Tanya Simkhovich, North Andover, MA (US); Ronald Harris, Bedford, NH (US); James John Politis, Windham, NH (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/855,020

(22) Filed: Apr. 22, 2020

(65) Prior Publication Data
US 2021/0334327 A1  Oct. 28, 2021

(51) Int. Cl.
| | |
|---|---|
| *G06F 16/20* | (2019.01) |
| *G06F 16/9538* | (2019.01) |
| *G06F 16/2457* | (2019.01) |
| *H04L 67/52* | (2022.01) |
| *G06F 3/04847* | (2022.01) |
| *G06F 16/9537* | (2019.01) |

(52) U.S. Cl.
CPC ...... *G06F 16/9538* (2019.01); *G06F 3/04847* (2013.01); *G06F 16/24578* (2019.01); *G06F 16/9537* (2019.01); *H04L 67/18* (2013.01)

(58) Field of Classification Search
None
See application file for complete search history.

(56) References Cited

U.S. PATENT DOCUMENTS

| | | | |
|---|---|---|---|
| 2010/0333145 A1 | 12/2010 | Chen et al. | |
| 2016/0061992 A1* | 3/2016 | Miller | G01W 1/10 702/3 |
| 2017/0293495 A1 | 10/2017 | Caunter et al. | |
| 2018/0174229 A1 | 6/2018 | Sherwin et al. | |
| 2018/0268332 A1* | 9/2018 | Rainey | G06F 16/2455 |
| 2018/0349446 A1 | 12/2018 | Triolo et al. | |

* cited by examiner

*Primary Examiner* — Belix M Ortiz Ditren
(74) *Attorney, Agent, or Firm* — Edell, Shapiro & Finnan, LLC

(57) ABSTRACT

A computer system provides personalized location-based weather services. Weather data for a location is processed to generate a plurality of panels, wherein each panel comprises weather information organized according to a topic of the panel. An order is determined for the plurality of panels, wherein the order is based on one or more factors including an interaction of a user with one or more previously presented panels, a selected event being identified, and a proximity of a forecasted event to a current time. A visualization is generated on a display, including the plurality of panels configured to be navigated according to the determined order. Embodiments of the present invention further include a method and program product for providing personalized location-based weather services in substantially the same manner described above.

18 Claims, 5 Drawing Sheets

US 11,334,640 B2

COMPUTERIZED LOCATION-BASED VISUALIZATION OF WEATHER EVENTS

BACKGROUND

1. Technical Field

Present invention embodiments relate to location-based computerized weather services, and more specifically, to location-based visualizations of weather and other events that are personalized for a user.

2. Discussion of the Related Art

Weather services, such as websites, software applications (including mobile applications), and other media, provide weather data to consumers that can include both current weather conditions and forecasts for future weather conditions. Weather data is typically organized and presented using a same layout for all users of a service. For example, a website or mobile application may present an hourly forecast, followed by a daily forecast and then a five-day forecast.

SUMMARY

According to one embodiment of the present invention, a computer system provides personalized location-based weather services. Weather data for a location is processed to generate a plurality of panels, wherein each panel comprises weather information organized according to a topic of the panel. An order is determined for the plurality of panels, wherein the order is based on one or more factors including an interaction of a user with one or more previously presented panels, a selected event being identified, and a proximity of a forecasted event to a current time. A visualization is generated on a display, including the plurality of panels configured to be navigated according to the determined order. Embodiments of the present invention further include a method and program product for providing personalized location-based weather services in substantially the same manner described above.

BRIEF DESCRIPTION OF THE DRAWINGS

Generally, like reference numerals in the various figures are utilized to designate like components.

DETAILED DESCRIPTION

Figure 1:
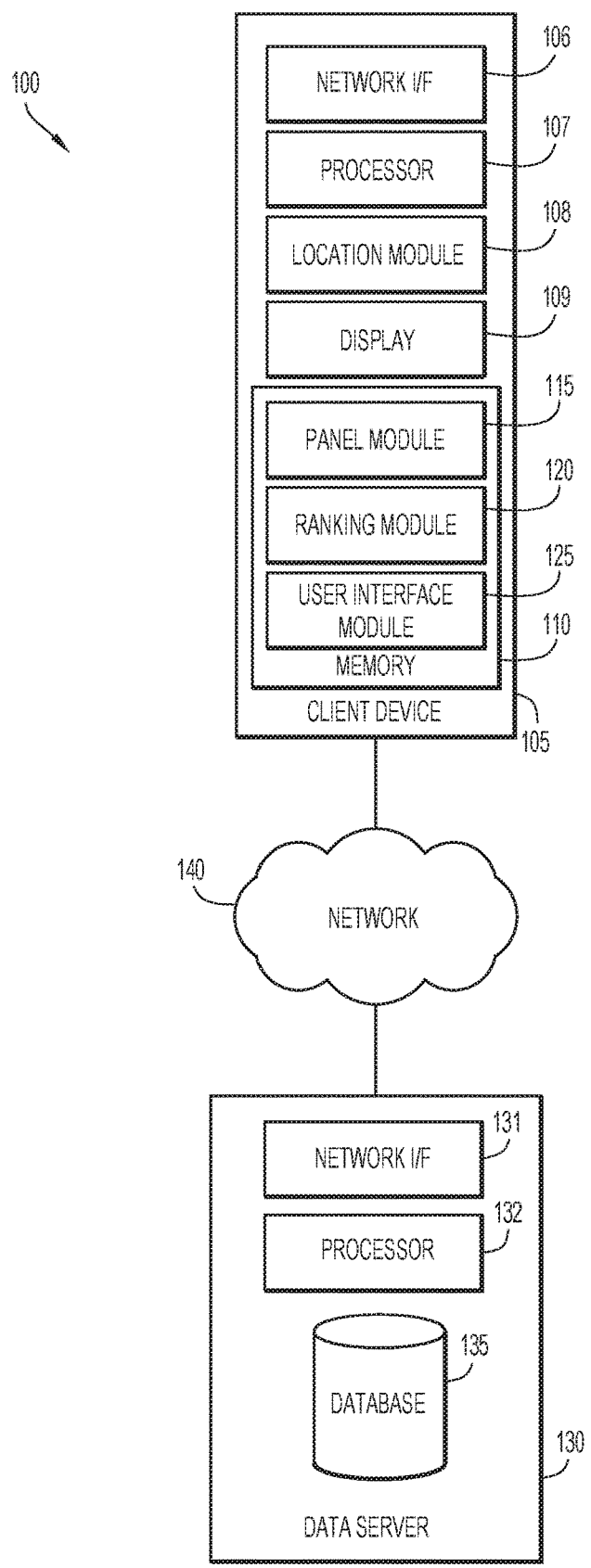
FIG. 1 is a block diagram depicting a computing environment for providing personalized location-based weather services in accordance with an embodiment of the present invention.

Present invention embodiments relate to location-based computerized weather services, and more specifically, to location-based visualizations of weather and other events that are personalized for a user. A weather service typically informs users of current and forecasted weather conditions for a location. Embodiments of the present invention involve a recognition that users may be required to read the entirety of a weather report in order to be informed of events or conditions that are relevant to the consumer. Thus, users can fail to notice important weather events that can positively or negatively impact them or struggle to draw conclusions from presented weather data. Moreover, weather services typically fail to highlight noteworthy weather events that can impact a user, such as unseasonably warm or cold temperatures, sudden or unexpected weather transitions, and the like. For example, a user may cancel his or her morning plans when the user observes a weather icon that indicates rainy conditions, despite the fact that the morning may be pleasant and rain is not expected until the afternoon. When a weather service uses a same template or presentation order for presenting weather data to all of its users, a user may have to spend an inordinate amount of time seeking a particular portion of a report that is of relevance to the user, or a user may focus on a portion of a report that is not particularly relevant and come away with a wrong conclusion.

Present invention embodiments provide personalized location-based weather services by providing a user with information according to the information's relevance to that user. Data relating to a user's consumption of weather services can be gathered and processed to identify particular interests and preferences of the user. Notable weather situations can be identified and presented in a manner that captures a user's attention. Additionally, the nature of the impact is determined so that users can be aware of both positive weather events and negative weather events. Other factors, such as a user's schedule, a time of day, and/or a day of week, may also be considered in identifying relevant portions of weather information.

Thus, present invention embodiments improve weather forecasting technology by providing users with weather insights that enable users to prepare for upcoming weather events that the users would otherwise fail to anticipate. Moreover, invention embodiments improve the efficiency of weather forecasting services by selectively presenting information based on its relevance to a particular user. By identifying information that is not relevant to the user, various computer processing and display operations can be omitted, thus reducing the amount of overall processing, memory, and power consumption of a computing device. Present invention embodiments modify computerized visualizations in order to provide efficient weather services that are personalized and relevant to a user.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for providing personalized location-based weather services in accordance with an embodiment of the present invention. As depicted, computing environment 100 includes a client device 105, a data server 130, and a network 140. It is to be understood that the functional division among components of computing environment 100 have been chosen for purposes of explaining present invention embodiments and is not to be construed as a limiting example.

Client device 105 includes a network interface (I/F) 106, at least one processor 107, a location module 108, a display 109, and memory 110 that includes a panel module 115, a ranking module 120, and a user interface module 125. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, a user of client device 105 may access or receive weather data in accordance with present invention embodiments. Client device 105 may include internal and external hardware components, as depicted and described in further detail with respect to FIG. 4.

Location module 108 may include any device capable of determining the location of client device 105. Location may include any geographical description, such as one or more of street address, zip code, city, state, latitude, longitude, and elevation. In one embodiment, location module 108 receives signals from a global positioning system in order to determine location. In another embodiment, location module 108 uses ground-based or other triangulation techniques to determine location. Location module 108 may share the location of client device 105 with data server 130 to obtain location-based weather data.

Display 109 may include any electronic visual display or screen capable of presenting information in a visual form. For example, display 109 may be a liquid crystal display (LCD), a cathode ray tube (CRT) display, a light-emitting diode (LED) display, an electronic ink display, and the like. Display 109 may present a graphical user interface to a user of client device 105 to present relevant weather data in accordance with present invention embodiments. Display 109 may include a touchscreen to enable a user of client device 105 to provide input, and/or a user may provide input via another mechanism (e.g., buttons, keyboard, mouse, etc.).

Panel module 115, ranking module 120, and user interface module 125 may include one or more modules or units to perform various functions of present invention embodiments described below. Panel module 115, ranking module 120, and user interface module 125 may be implemented by any combination of any quantity of software and/or hardware modules or units, and may reside within memory 110 of client device 105 for execution by a processor, such as processor 107.

Panel module 115 may obtain weather data for one or more locations and generate visualization panels that each include some grouping of weather data according to a particular topic or relationship. Initially, panel module 115 may obtain weather data from a database such as database 135 of data server 130. Panel module 115 may obtain weather data related to a particular location, such as a user-indicated location and/or a current or previous location of client device 105 as determined according to location module 108. Weather data obtained by panel module 115 can include any historical, recent, current, and/or forecasted data, including temperature data, humidity data, precipitation data, cloud cover data, atmospheric pressure data, air quality data, pollen count data, ultraviolet radiation data, and/or any other observable or forecastable data values. Additionally or alternatively, data obtained by panel module 115 may include data indirectly related to weather, or unrelated to weather, such as traffic data (e.g., information about current or expected traffic congestion), disease-related data (e.g., data indicating an influenza outbreak), data relating to natural disasters or disasters caused by human activity (such as fires, earthquakes, etc.) and the like.

Panel module 115 processes obtained data to generate one or more visualization panels that include weather and other information organized according to a particular subject. Panel module 115 may perform further processing on obtained data to generate a panel and/or may identify selected portions of obtained data in order to generate a panel. Panel module 115 may generate panels according to predetermined panel templates. In particular, panel module 115 may populate a template with obtained data in order to generate a visualization panel. For example, an hourly forecast panel may include a table whose rows are populated with temperature forecast data for each hour. In some embodiments, panel module 115 generates panel templates using a machine learning-based approach in which a conventional or other topic detection model is applied to identify a group of data according to a common topic, which is then used to generate a panel template.

Panel module 115 may generate different types of panels, with each type corresponding to a particular topic or subject. Panel types may include, for example, a current condition panel, a short-term forecast panel, a long-term forecast panel, a weekend forecast panel, a radar panel, and a weather event panel. Time-series data may be presented on a panel at any level of granularity, such as a half-hour level, an hourly level, a daily level, and the like. A current condition panel may include weather and other data that have been recently observed and/or are forecasted to be currently occurring. The current condition panel may include information that is associated with a point of time or span of time that falls within a threshold distance from a current time, such as an hour interval, a thirty minute interval, a ten minute interval, and the like. A short-term forecast panel may include forecasted weather and other data for a window of time extending hours into the future. For example, a short-term forecast panel may include forecasted data, arranged by hour, for any of a next three hours, a next eight hours, a next twelve hours, a next twenty-four hours, a next forty-eight hours, and the like. Similarly, a long-term forecast panel may include forecasted weather and other data for a window of time extending farther into the future than a short-term forecast panel. For example, a long-term forecast panel may include forecasted data, arranged by hour or by day, for a next three days, a next five days, a next week, and the like. A weekend forecast panel may include forecasted weather and other data for an upcoming weekend.

A radar panel may present still and/or video imagery of weather radar (e.g., Doppler radar). A radar panel may distinguish various types of precipitation (e.g., rain, snow, etc.) by color, or precipitation types may be separately depicted using different radar panels.

A weather event panel may indicate a particular weather event of note, including current and forecasted events. In some embodiments, current and/or forecasted weather data may be compared to baseline weather data in order to identify a weather event. In some embodiments, a rules-based system is employed to identify weather events, which may optionally be classified as either positive or negative weather events. One or more values for current or forecasted weather conditions can be compared to baseline values to identify weather events whenever the current or forecasted value deviates from the corresponding baseline value by a predetermined threshold. Baseline values are location-specific, and may be based on averages of historical values over years, previous recent values, or other values that would be expected to be observed at a given location when the location is not experiencing the weather event in question. For example, when historical weather data indicates that the temperature for a time and place normally decreases after sunset, but weather forecast data predicts an upcoming temperature increase after sunset, panel module 115 may identify a temperature-related weather event. Panel module 115 may thus generate a weather event panel for any impactful event, such as a forecasted temperature exceeding a baseline temperature value by 20%, a rainfall that exceeds a particular amount in an hour, an occurrence of freezing rain, hail, or snow, a severe thunderstorm, and the like.

In some embodiments, panel module 115 may generate panels that display media of interest, such as a picture of the day or article of the day. Panel module 115 may generate an air quality panel that includes information such as an air quality index, a smog alert, a pollen count, and the like. In various embodiments, panel module 115 may generate panels that contain information relating to such topics as natural disasters (e.g., earthquakes or fires), particular storm systems (e.g., tropical cyclones), communicable diseases (e.g., influenza epidemics), and the like.

Ranking module 120 determines an order in which generated panels are presented to a user. Each panel is analyzed in terms of its relevance to a given user in order to identify an order of panels that is personalized according to the user's preferences and interests. While a user can stipulate preferences for the order of panels, ranking module 120 may determine an order without requiring any explicit user input, thus automatically delivering weather and other information to a user in an optimal manner. Generally, ranking module 120 identifies how relevant each panel is to a given user, and ranks the panels in order of decreasing relevance such that panels of greater relevance are presented to a user before panels of lesser relevance.

In some embodiments, ranking module 120 determines the relevance of panels by analyzing interactions of a user with previously-presented panels. User feedback may be collected as a user interacts with panels to identify how quickly the user scrolls through panels and the amount of dwell time of a user on each panel. Dwell time for a panel may correspond to the amount of time that a panel is presented on display 109, and may be normalized with respect to the user's dwell time for other panels during an interaction session. In some embodiments, dwell time may be counted when a user is attentive, which can be determined using conventional or other gaze tracking techniques. Ranking module 120 may base panel relevance on other user interactions, such as when a user presses a play button or expands a menu of a panel. Thus, ranking module 120 can identify certain panel types as more relevant than other panel types.

In some embodiments, the relevance of panels is determined based on the presence of one or more selected events. Ranking module 120 may assign a higher relevance to any weather event panels included in a given set of generated panels so that a user can be made aware of the weather event. Weather event panels are generated by panel module 115 when current or forecasted values exceed baseline values by a predetermined threshold. For example, ranking module 120 may place a panel describing an upcoming thunderstorm, which is forecasted to cause a downfall of several inches of rain, toward the beginning of an order so that the user may be made aware of the event.

In some embodiments, the relevance of panels is determined according to the proximity of a forecasted event to a current time. Identified weather events and weekend forecasts may be identified as less relevant when those events are more distant from a current time than if those events are closer to a current time. For example, ranking module 120 may determine that a weekend forecast panel is less relevant when panels are presented on a Monday, but may increase the relevance of the weekend forecast panel when the panels are presented on a Thursday, so that a user can be readily informed about the upcoming weekend's weather.

In some embodiments, ranking module 120 calculates a relevance score for each panel of a group of generated panels. The relevance score for a panel is based on one or more factors, which can include interactions of a user with previously-presented panels, a selected event being identified, and a proximity of a forecasted event to a current time. Ranking module 120 may implement a rules-based scoring system to award points to panel types based on these factors. For example, each time a user has a positive interaction with a panel of a particular panel type, that panel type's score may be increased by a value of one. Selected event type panels may be provided with a particular score that is based on the specific type and/or severity of selected event that is identified. For example, a selected event panel that describes a natural disaster may be assigned a higher score than a selected event panel describing a forecasted snowfall. Similarly, a selected event's score may be scaled with the degree to which the selected event's data values diverge from the baseline values. Points may also be assigned to future forecasted events based on their proximity to a current time. For example, a score of 0.3 may be assigned to a weekend forecast panel when the score is determined on a Monday, but the weekend forecast panel may receive a score of 2.0 when evaluated on a Thursday. In some embodiments, weight values may be assigned to the various factors so that some factors have a greater influence on a panel's relevance score. The total relevance score for each panel in a generated group of panels may be used to rank the panels in descending order from highest relevance score to lowest relevance score.

User interface module 125 generates a visualization that presents panels to a user of client device 105 according to the order determined by ranking module 120. User interface module 125 provides a graphical user interface to a user via display 109. In some embodiments, user interface module 125 presents one panel at a time, starting with the first panel (e.g., the panel having the highest relevance score). A user may provide input to client device 105 to navigate between panels. For example, in embodiments in which display 109 is a touchscreen display, a user may swipe horizontally to navigate between panels: swiping in one direction may cause user interface module 125 to present a next panel ranked lower in relevance than the current panel, and swiping in the other direction may cause user interface module 125 to present a next panel ranked higher in relevance than the current panel. Examples of panels presented using the graphical user interface of user interface module 125 are depicted and described in further detail with respect to FIGS. 3A-3D.

Data server 130 includes a network interface (I/F) 131, at least one processor 132, and a database 135. Data server 130 may include a personal computer (PC), a desktop computer, a rack-mounted server, or any programmable electronic device capable of executing computer readable program instructions. Network interface 131 enables components of data server 130 to send and receive data over a network, such as network 140. In general, data server 130 collects and stores weather and other data to support personalized location-based weather services. Data server 130 may include internal and external hardware components, as depicted and described in further detail with respect to FIG. 4.

Database 135 may include any non-volatile storage media known in the art. For example, database 135 can be implemented with a tape library, optical library, one or more independent hard disk drives, or multiple hard disk drives in a redundant array of independent disks (RAID). Similarly, data in database 135 may conform to any suitable storage architecture known in the art, such as a file, a relational database, an object-oriented database, and/or one or more tables. Database 135 may store any weather and/or other data relating to one or more locations, including weather data collected via past or present measurements, data associated with weather forecasts, any other data related to weather events or conditions, and other data, such as air quality data, natural disaster data, ultraviolet index data, and the like.

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between client device 105 and data server 130 via their respective network interfaces in accordance with embodiments of the present invention.

Figure 2:
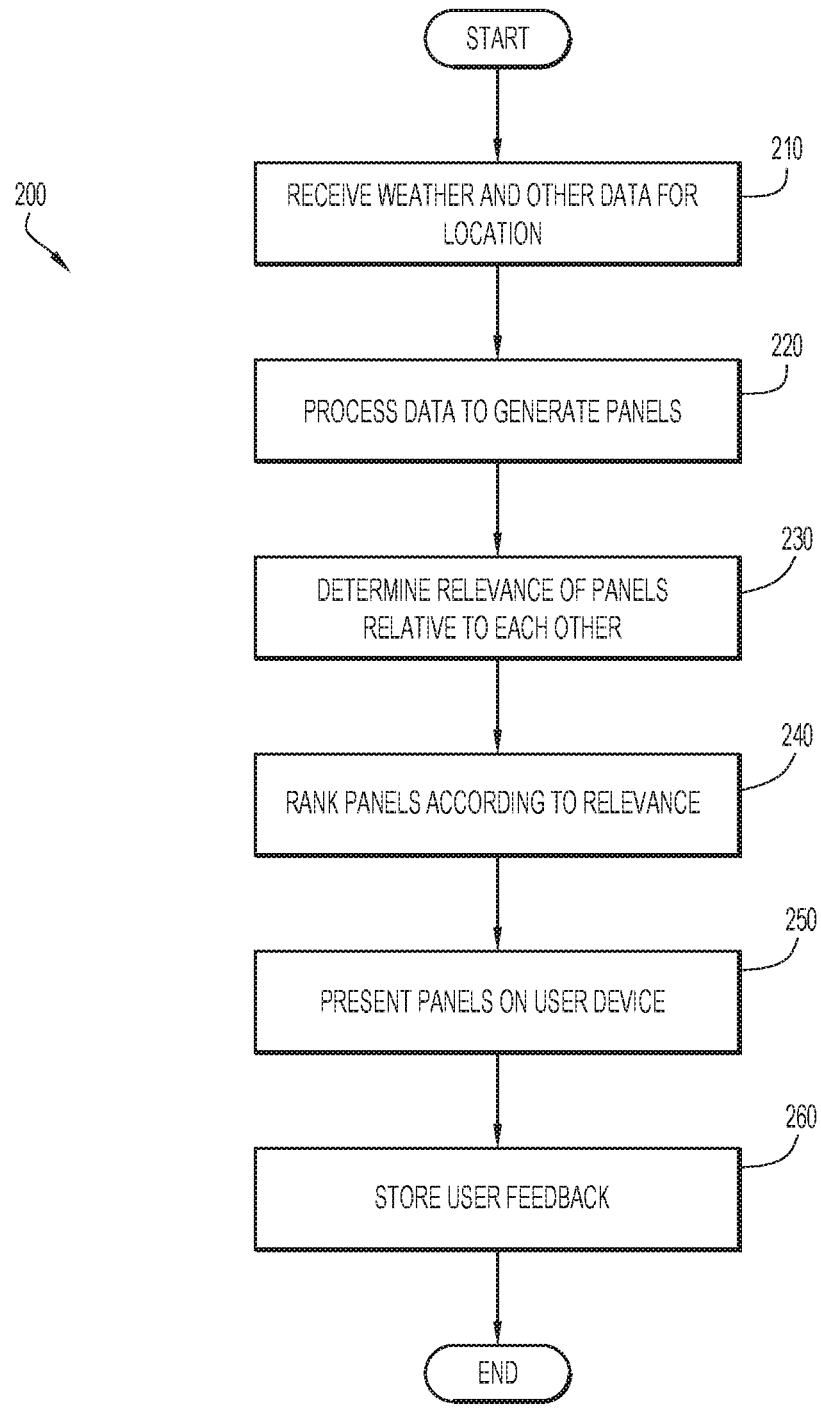
FIG. 2 is a flow chart depicting a method of providing personalized location-based weather services in accordance with an embodiment of the present invention.

FIG. 2 is a flow chart depicting a method 200 of providing personalized location-based weather services in accordance with an embodiment of the present invention.

Weather data and/or other data for an indicated location is received at operation 210. A user of client device 105 may select one or more locations for which the user would like to receive location-based services, and/or a location of client device 105 (e.g., as determined by location module 108) may be selected. A location may include a current location (e.g., as determined according to location module 108 of client device 105) and/or other locations, such as a particular zip code, city, county, state, or other geographical description. Data may be obtained from one or more databases, such as database 135 of data server 130, and may be identified by executing a database query. The received data may include time-series or other data. The weather data received by client device 105 may include any data relating to atmospheric conditions that is collected via past or present measurements and/or any data produced via one or more weather forecasting models. Weather data may include, for example, temperate data, humidity data, precipitation data, wind speed and/or direction data, wind chill data, heat index data, atmospheric pressure data, and the like. Other data received by client device 105 may include air quality data, natural disaster data, ultraviolet index data, and the like.

The data is processed to generate panels at operation 220. Panel module 115 may generate a set of panels that includes panels of various panel types. For example, a set of panels may include a current condition panel, a short-term forecast panel, a long-term forecast panel, a weekend forecast panel, a radar panel, and a weather event panel. Panel module 115 may identify data values for panels in the received data, and/or may additionally process the received data for a location to extract values for populating each panel. For example, time-series temperature data may be processed to identify a daily average temperate, a daily high temperature, and a daily low temperature. Panel module 115 may use panel templates to generate panels, with each template including one or more fields that are associated with particular data values. For example, when panel module 115 encounters a %DailyHigh% field in a template, panel module 115 may insert the daily high temperature value for the indicated location.

The relevance of each panel is determined relative to the other generated panels at operation 230. Ranking module 120 determines an order in which the generated set of panels may be presented to a user. Each panel is analyzed in terms of its relevance to a given user so that the panels can be ranked and presented in order of relevance. Ranking module 120 may analyze various factors to determine the relevance of a panel, including the user's previous interaction with panels of a same panel type, the presence of a particular weather event panel in the set of panel as well as the severity of the weather event, and the proximity of forecasted events or conditions to a current time.

In some embodiments, ranking module 120 analyzes a generated set of panels to assign a relevance score to each panel. A predetermined rules-based scoring system may be employed to assign points to each panel in a set of panels based on factors such as the panel type and content of each panel. For example, a user's dwell time for various panel types over one or more prior sessions can be analyzed to determine which panel types most capture a user's interest; any panels matching these panel types may be rewarded by increasing their relevance score by a specified amount. Ranking module 120 may assign points to increase the relevance scores of any panels that correspond to a selected event, which may be identified when one or more weather values deviate from corresponding baseline values by a threshold amount. Ranking module 120 may assign points based on the proximity in time of a forecasted event to the current time. For example, a panel relating to an event that is forecasted to occur several days from a current time may be assigned a small amount of points or no points, whereas an panel detailing an event that is forecasted to occur in the next several hours or day may be assigned a higher amount of points. In some embodiments, weights may be applied to one or more of the various factors to increase or decrease their influence.

The panels are ranked according to their relevance at operation 240. Ranking module 120 may compare the relevance of each panel relative to the other panels of a set of panels to determine an order for the panels. A most relevant panel may be assigned to a first position of the order, followed by the remaining panels in order of decreasing relevance.

The panels are presented in a visualization on a user device at operation 250. Panels may be presented individually, beginning with the panel that is identified as most relevant to a user. The user may browse backward and forward through the set of panels, which are arranged in the determined order. In some embodiments, any panel having a relevance score that does not exceed a minimum threshold value may be omitted from the presented set of panels. Alternatively, only a predetermined number of the most highly relevant panels may be presented (e.g., the top five most relevant panels, etc.).

User feedback is stored at operation 260. A user's dwell time on each panel and/or any user interactions with panels may be captured by user interface module 125 and recorded for subsequent use in determining panel order in a future session. In some embodiments, feedback is stored locally (e.g., at client device 105). Storing feedback locally may additionally provide improved data privacy to users. In other embodiments, some or all of the feedback may be transmitted to a server, such as data server 130, where the feedback may be stored and/or further analyzed.

FIGS. 3A-3D are user interface illustrations depicting example ordered sets of panels 300, 325, 350, and 375 in accordance with embodiments of the present invention. Each ordered set of panels 300, 325, 350, and 375 indicates panels in descending order of relevance (from left to right as viewed in FIGS. 3A-3D).

Figure 3A:
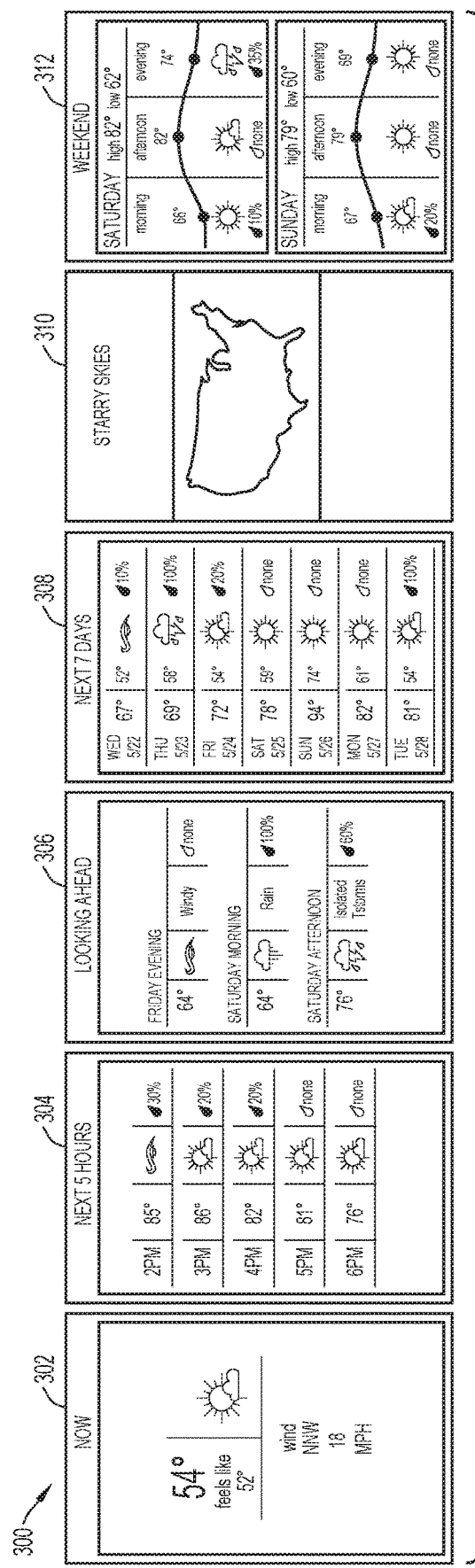
FIGS. 3A-3D are user interface illustrations depicting ordered sets of panels in accordance with an embodiment of the present invention.

FIG. 3A depicts ordered set 300 that includes a current condition panel 302, a short-term forecast panel 304, a next day forecast panel 306, a long-term forecast panel 308, a visibility panel 310, and a weekend forecast panel 312. As ordered set 300 is arranged in descending order, indicating that current condition panel 302 is the most relevant panel in ordered set 300 and that the weekend forecast panel 312 is the least relevant panel. Ordered set 300 may present short-term forecast panel 304 before next day forecast panel 306 because a user spent more time viewing a short-term forecast panel than a next day forecast panel during one or more previous sessions. Moreover, weekend panel 312 may be least in relevance because ordered set 300 is presented during a session that a user initiated on a Tuesday, which is not considered to be proximate in time to the next weekend according to a predetermined set of rules.

Figure 3B:
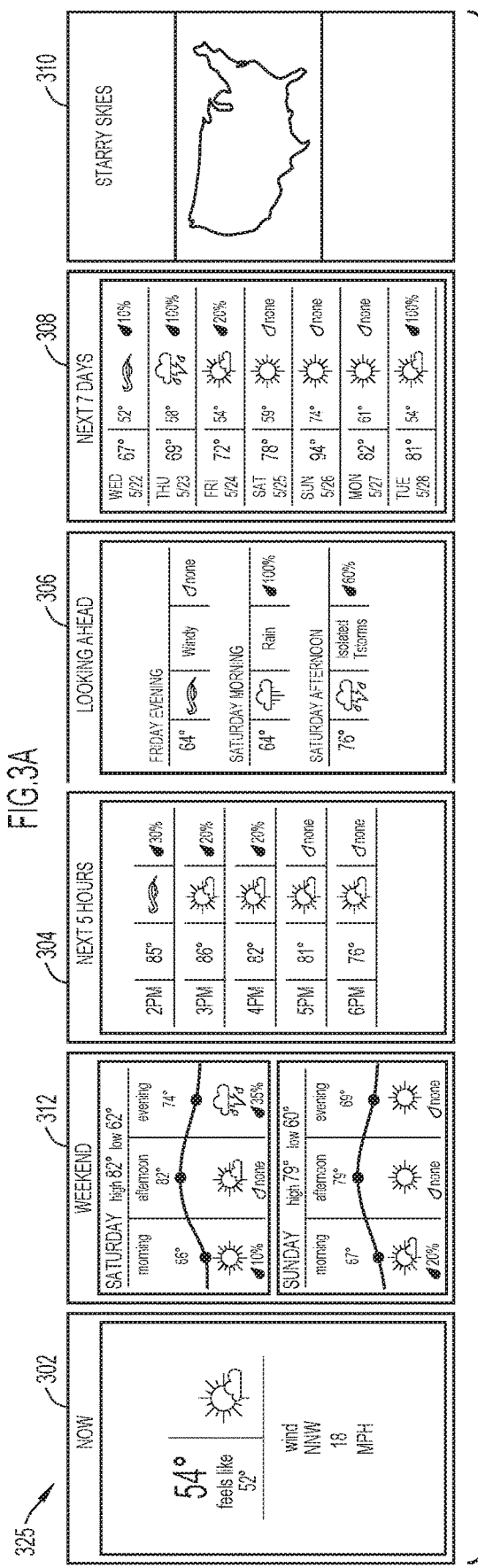

FIG. 3B depicts ordered set 325 that includes a current condition panel 302, a weekend forecast panel 312, a short-term forecast panel 304, a next day forecast panel 306, a long-term forecast panel 308, and a visibility panel 310. As compared to ordered set 300, weekend forecast panel 312 has been determined to be more relevant in ordered set 325. For example, ranking module 120 may assign weekend forecast panel 312 a higher relevance score because ordered set 325 is generated on a Friday, which is closer in proximity to the weekend.

Figure 3C:
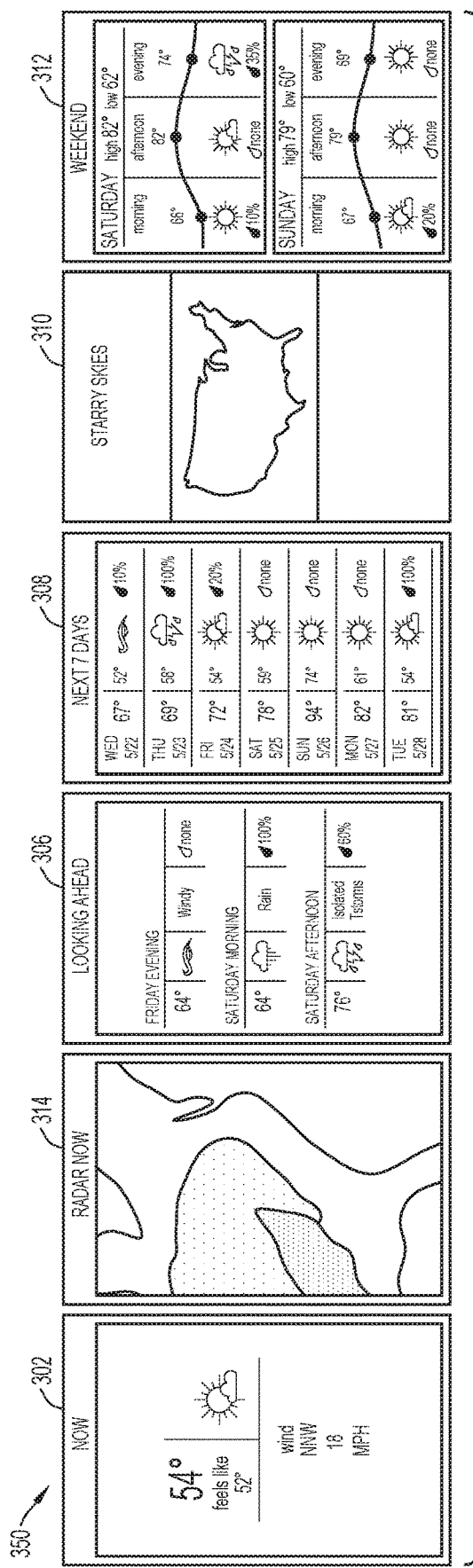

FIG. 3C depicts ordered set 350 that includes a current condition panel 302, a radar panel 314, a next day panel 306, a long-term forecast panel 308, a visibility panel 310, and a weekend forecast panel 312. Ordered set 350 may include a radar panel 314 because it is associated with a selected event that has been identified. For example, due to a thunderstorm, one or more forecasted weather values may deviate from their baseline values by a threshold amount. Radar panel 314 may be deemed to be highly relevant due to one or more factors, such as the severity of the storm, and so radar panel 314 is ranked second in order of relevance.

Figure 3D:
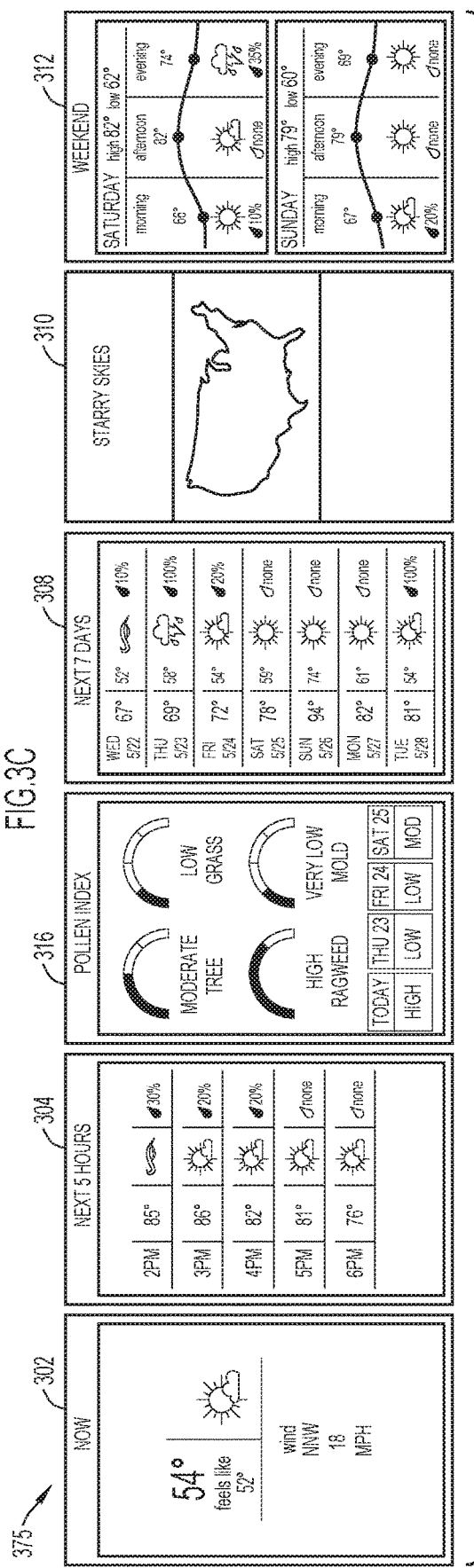

FIG. 3D depicts ordered set 375 that includes a current condition panel 302, a short-term forecast panel 304, a pollen index panel 316, a long-term forecast panel 308, a visibility panel 310, and a weekend forecast panel 312. Ordered set 375 may be presented to a user who has previously indicated interest in allergy information. For example, the user may have interacted with a pollen index panel in one or more previous sessions, and/or the user may have dwelled for a lengthy amount of time on a pollen index panel or other allergy-related panel. Additionally or alternatively, pollen index panel 316 may be ranked higher in relevance because a current pollen index value exceeds a baseline value by a threshold amount. Since visualizations are user-specific or device-specific, two different users at a same or similar location who receive the same or similar weather information may be provided with different panels and/or panels in different orders depending on the various factors that relate the relevance of panels to users.

Figure 4:
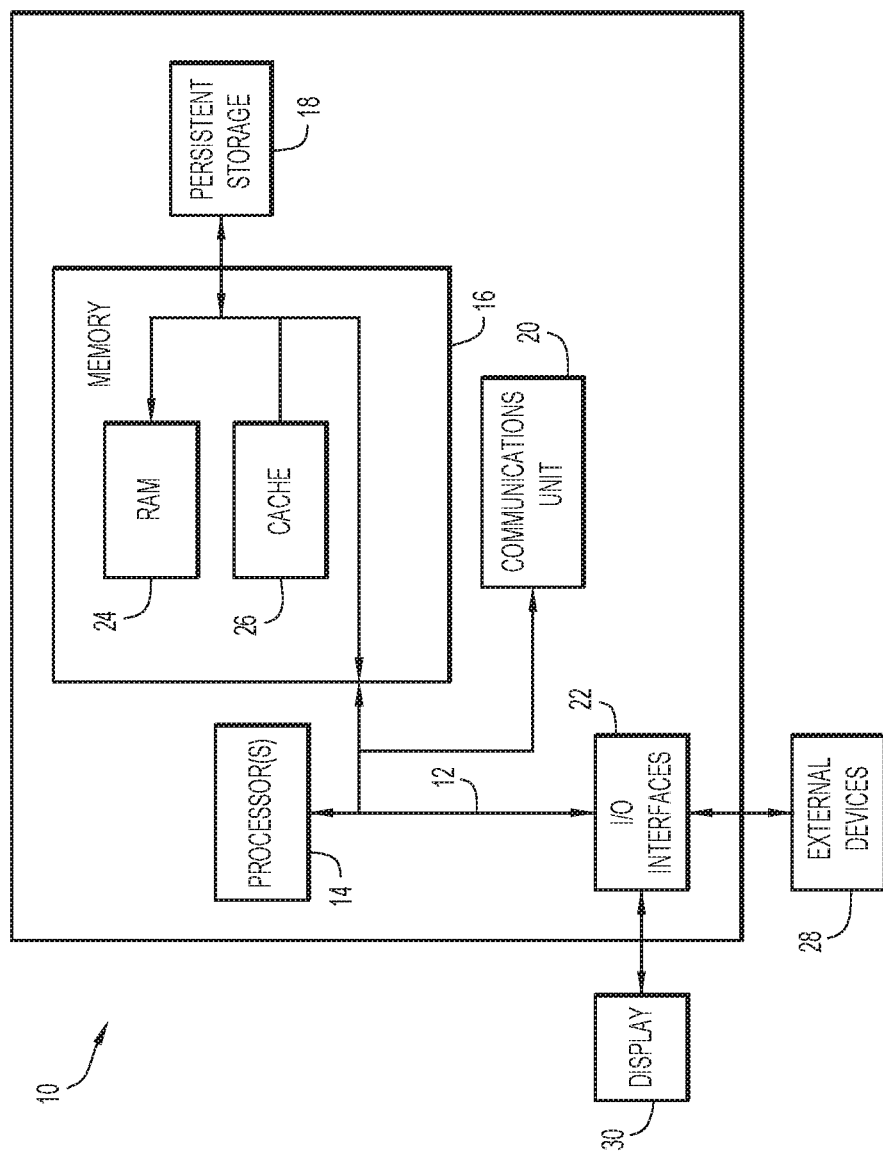
FIG. 4 is a block diagram depicting a computing device in accordance with an embodiment of the present invention.

FIG. 4 is a block diagram depicting components of a computer 10 suitable for executing the methods disclosed herein. Computer 10 may implement client device 105 and/or data server 130 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to personalized location-based forecasting of weather and other events (e.g., current weather data, forecasted weather data, baseline values, user interaction data, panel relevance data, panel template data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and data server 130 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to personalized location-based forecasting of weather and other events (e.g., current weather data, forecasted weather data, baseline values, user interaction data, panel relevance data, panel template data, etc.) may include any information provided to, or generated by, client device 105 and/or data server 130. Data relating to personalized location-based forecasting of weather and other events may include any desired format and arrangement, and may include any quantity of any types of fields of any size to store any desired data. The data relating to personalized location-based forecasting of weather and other events may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to personalized location-based forecasting of weather and other events), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing personalized location-based forecasting of weather and other events.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, panel module 115, ranking module 120, user interface module 125, etc.). These systems may include any types of monitors and input devices (e.g., keyboard, mouse, voice recognition, etc.) to enter and/or view information.

It is to be understood that the software (e.g., communications software, server software, panel module 115, ranking module 120, user interface module 125, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, panel module 115, ranking module 120, user interface module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to personalized location-based forecasting of weather and other events). The database system may be implemented by any number of any conventional or other databases, data stores or storage structures (e.g., files, databases, data structures, data or other repositories, etc.) to store information (e.g., data relating to personalized location-based forecasting of weather and other events). The database system may be included within or coupled to the server and/or client systems. The database systems and/or storage structures may be remote from or local to the computer or other processing systems, and may store any desired data (e.g., data relating to personalized location-based forecasting of weather and other events).

The present invention embodiments may employ any number of any type of user interface (e.g., Graphical User Interface (GUI), command-line, prompt, etc.) for obtaining or providing information (e.g., data relating to personalized location-based forecasting of weather and other events), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, identifying current and future events based on their relevance to a particular user, and communicating information relating to those events in a manner that draws a user's attention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for providing personalized location-based computerized weather services, comprising:
    processing weather data, by a user device, for a location to generate a plurality of panels, wherein each panel comprises weather information organized according to a topic of the panel, wherein a machine-learning topic detection model is applied to identify the weather information that is specific to the topic of each panel;
    determining an order for the plurality of panels, wherein the order is based on one or more factors including an interaction of a user with one or more previously presented panels, a selected event being identified, and a proximity of a forecasted event to a current time; and
    generating a visualization, on a display, including the plurality of panels configured to be navigated according to the determined order, wherein the graphical user interface displays a next panel according to the determined order of the plurality of panels in response to input by a user of the user device.

2. The computer-implemented method of claim 1, further comprising:
    calculating a relevance score for each panel based on the one or more factors; and
    wherein the order is determined according to the relevance score of each panel.

3. The computer-implemented method of claim 1, wherein the interaction of the user includes a dwell time for one or more panels during one or more previous sessions.

4. The computer-implemented method of claim 1, wherein the selected event is identified by determining that one or more weather values deviate from a corresponding one or more baseline values by a threshold amount.

5. The computer-implemented method of claim 1, wherein the plurality of panels includes one or more of: a current condition panel, a short-term forecast panel, a long-term forecast panel, a radar panel, a weather event panel, and a weekend forecast panel.

6. The computer-implemented method of claim 1, wherein the display comprises a graphical user interface that displays one panel at a time.

7. A computer system for providing personalized location-based weather services, the computer system comprising:
    one or more computer processors;
    one or more computer readable storage media;
    program instructions stored on the one or more computer readable storage media for execution by at least one of the one or more computer processors, the program instructions comprising instructions to:
    process weather data, by a user device, for a location to generate a plurality of panels, wherein each panel comprises weather information organized according to a topic of the panel, wherein a machine-learning topic detection model is applied to identify the weather information that is specific to the topic of each panel;
    determine an order for the plurality of panels, wherein the order is based on one or more factors including an interaction of a user with one or more previously presented panels, a selected event being identified, and a proximity of a forecasted event to a current time; and
    generate a visualization, on a display, including the plurality of panels configured to be navigated according to the determined order, wherein the graphical user interface displays a next panel according to the determined order of the plurality of panels in response to input by a user of the user device.

8. The computer system of claim 7, wherein the program instructions further comprise instructions to:
calculate a relevance score for each panel based on the one or more factors; and
wherein the order is determined according to the relevance score of each panel.

9. The computer system of claim 7, wherein the interaction of the user includes a dwell time for one or more panels during one or more previous sessions.

10. The computer system of claim 7, wherein the selected event is identified by determining that one or more weather values deviate from a corresponding one or more baseline values by a threshold amount.

11. The computer system of claim 7, wherein the plurality of panels includes one or more of: a current condition panel, a short-term forecast panel, a long-term forecast panel, a radar panel, a weather event panel, and a weekend forecast panel.

12. The computer system of claim 7, wherein the display comprises a graphical user interface that displays one panel at a time.

13. A computer program product for providing personalized location-based weather services, the computer program product comprising one or more computer readable storage media collectively having program instructions embodied therewith, the program instructions executable by a computer to cause the computer to:
process weather data, by a user device, for a location to generate a plurality of panels, wherein each panel comprises weather information organized according to a topic of the panel, wherein a machine-learning topic detection model is applied to identify the weather information that is specific to the topic of each panel;
determine an order for the plurality of panels, wherein the order is based on one or more factors including an interaction of a user with one or more previously presented panels, a selected event being identified, and a proximity of a forecasted event to a current time; and
generate a visualization, on a display, including the plurality of panels configured to be navigated according to the determined order, wherein the graphical user interface displays a next panel according to the determined order of the plurality of panels in response to input by a user of the user device.

14. The computer program product of claim 13, wherein the program instructions further cause the computer to:
calculate a relevance score for each panel based on the one or more factors; and
wherein the order is determined according to the relevance score of each panel.

15. The computer program product of claim 13, wherein the interaction of the user includes a dwell time for one or more panels during one or more previous sessions.

16. The computer program product of claim 13, wherein the selected event is identified by determining that one or more weather values deviate from a corresponding one or more baseline values by a threshold amount.

17. The computer program product of claim 13, wherein the plurality of panels includes one or more of: a current condition panel, a short-term forecast panel, a long-term forecast panel, a radar panel, a weather event panel, and a weekend forecast panel.

18. The computer program product of claim 13, wherein the display comprises a graphical user interface that displays one panel at a time.

* * * * *